United States Patent Office 3,022,255
Patented Feb. 20, 1962

3,022,255
CELLULAR POLYURETHANE PLASTIC AND
METHOD OF PREPARING SAME
Heinrich Morschel, Leverkusen, and Günther Loew, Koln, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Dec. 3, 1958, Ser. No. 777,823
Claims priority, application Germany Dec. 3, 1957
8 Claims. (Cl. 260—2.5)

This invention relates to polyurethane plastics and, more particularly, to cellular polyurethane plastics which are obtained by reacting an organic polyisocyanate, polyhydroxyl compounds containing at least three hydroxyl groups, and water.

It has been known heretofore to use polyhydroxyl compounds containing ether linkages, such as, for example, polyalkylene ether glycols, modified polyalkylene ether glycols, and the like, in the manufacture of polyurethane plastics by the polyisocyanate polyaddition process. Preferably, the polyhydroxyl compounds containing ether linkages are, in a first step, reacted with an excess organic polyisocyanate to provide a compound having free NCO groups and this reaction product is then foamed in a second step with the addition of water together with additives, such as, for example, catalysts, and emulsifiers which provide a uniform cell.

The heretofore known polyhydroxyl compounds compounds containing ether linkages, when modified with organic polyisocyanates and reacted with water, exhibit a slow curing rate. The slow curing rate is a disadvantage because carbon dioxide, which is evolved from the reaction of isocyanato groups with water, tends to escape with the resultant collapse of the structure. Moreover, the heretofore known polyhydroxyl compounds containing ether linkages, when modified with organic polyisocyanate, have been difficult to process on existing mixing apparatuses because of their high viscosity.

It is an object of the present invention to provide novel polyurethane plastics having an improved elasticity. Another object of the invention is to provide an improved process for the production of polyurethane plastics. Still another object of the invention is to provide polyurethane plastics which rapidly cure, thus preventing the escape of carbon dioxide evolved from the reaction of an isocyanato group with water. A further object of the invention is to provide polyurethane plastics which may be manufactured on the currently available mixing apparatuses. Still another object is to provide novel polyhydroxyl compounds which are especially suitable for reaction with organic polyisocyanates in the manufacture of polyurethane plastics.

The above objects and others are accomplished, generally speaking, by providing improved polyurethane plastims which are obtained by reacting an organic polyisocyanate, a condensation or copolymerization product containing ether linkages and at least three hydroxyl groups, and water. The condensation product containing ether linkages and at least three hydroxyl groups is obtained in accordance with the invention by condensing or copolymerizing tetrahydrofuran, epichlorohydrin, and an alkylene oxide followed by subsequent treatment of the product thus obtained to replace the halogen atoms with hydroxyl groups.

The polyhydroxyl compound having ether linkages and at least three hydroxyl groups may be prepared, for example, by the process described in French Patent No. 898,269. When copolymerizing tetrahydrofuran, alkylene oxides, and epichlorohydrin, condensation or polymerization products are obtained which contain a high content of halogen atoms as well as free or esterified hydroxyl groups. The halogen atoms originate from the epichlorohydrin which is incorporated into the product by polymerization and from the catalysts used in the polymerization reaction. Such catalysts are, for example, the tertiary oxonium salts of alkylene oxides, or metallic or non-metallic halides, the etherates of which are capable of forming tertiary oxonium salts, as well as from the additives which may be used, such as, for example, carboxylic acid halides, thionyl chloride, α-chlorodimethyl ether, or chlorosulphonic acid.

Consequently, the condensation or copolymerization product must first be modified in a known manner, with concurrent saponification of esterified hydroxyl groups which may be present, to replace the halogen atoms with hydroxyl groups or by radicals containing hydroxyl groups. This may be effected, for example, in accordance with the process of German Patent No. 883,506 by using an excess of a glycolate having the formula

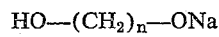

$$HO-(CH_2)_n-ONa$$

wherein $n$ is an integer of from 2 to 6. Any suitable glycolate may be used in accordance with the present invention. Suitable glycolates are, for example, solutions of an alkali, such as, sodium hydroxide treated with an excess of any suitable glycol, such as, for example, ethylene glycol, propylene glycol, butylene glycol, amylene glycol, and the like.

The quantities in mole equivalents of the various reactants comprising the polyhydroxyl compound having ether linkages and at least three hydroxyl groups may be varied within wide limits. However, it is preferred that epichlorohydrin comprise from about 1% to about 10%. The remainder of the copolymer may be varied within wide limits between tetrahydrofuran and alkylene oxide. However, it is preferred that the tetrahydrofuran and alkylene oxide be present in the remainder in ratios of from about 5% to about 95% and from about 95% to about 5%, respectively.

The polyhydroxyl compound containing ether linkages and at least three hydroxyl groups preferably has a molecular weight of at least about 500 and an hydroxyl number of less than about 225.

Any suitable organic polyisocyanate may be used in accordance with the present invention, however, aromatic diisocyanates are preferred. Examples of suitable organic polyisocyanates are, for example, ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, tolylene-2,4-diisocyanate, tolylene-2,6-diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenyl methane triisocyanate, 1,5-naphthalene diisocyanate, and the like.

Any suitable alkylene oxide having from two to five carbon atoms may be used in accordance with the present invention, such as, for example, ethylene oxide, propylene oxide, butylene oxide, and amylene oxide. The polyhydroxyl compounds having ether linkages and at least three hydroxyl groups to be used in accordance with the invention may be used by themselves or in admixture with the known linear polyalkylene ether glycols, such as, for example, polyalkylene ether glycol, polypropylene ethylene glycol, polytetrahydrofuran, or mixtures thereof, and the like, prior to reaction with an organic polyisocyanate and water to provide the improved polyurethane plastics provided by the invention.

It is preferred to use suitable catalysts when carrying out the foaming of the polyurethane plastics in the presence of water. Examples of suitable catalysts are the tertiary amines, such as, dimethyl hexahydroaniline, N-methyl morpholine, N-ethyl morpholine, the product of the reaction of N,N'-diethylaminoethanol with phenyl isocyanate, bis-diethylaminoethanoladipate, and organic metal compounds, such as, metallic soaps, and the like. It is also desirable to employ an emulsifier, such as, for example, sulphuration products of hydrocarbons or sulphonated castor oil, as well as fillers, dyes, and the like. The addition of silicone oil has proved particularly desirable to produce cellular polyurethane plastics of uniform cell size. Any suitable liquid organo polysiloxane may be used as a silicone oil provided the viscosity thereof is from about 10 to about 500 centistokes at 20° C. Examples of suitable silicone oils include dimethyl siloxane polymers having a viscosity of 20 centistokes, dimethyl siloxane polymers having a viscosity of 440 centistokes at 20° C., and mixtures thereof.

The reaction of the organic polyisocyanate with the polyhydroxyl compounds containing ether linkages and at least three hydroxyl groups in accordance with the invention is effected by using the sufficient quantity of organic polyisocyanate so that free isocyanato groups are present over the amount of hydroxyl groups present in the polyhydroxyl compound; in other words, an excess of the organic polyisocyanate is used. The production of cellular polyurethane plastic by the addition of water may be effected at any desired time during or after the reaction between the polyhydroxyl compound and the organic polyisocyanate. It can be effected intermittently but may also be effected on a continuously operating mixer, such as, that described in United States Patent No. 2,764,565.

By varying the NCO content of the branched isocyanate modified polyhydroxy compound and by varying the quantity of water added, the amount of carbon dioxide evolved can be controlled and by suitable selection of the activator added the specific gravity of the resulting cellular product may be varied within wide limits.

The foam materials obtained in this way, using the branched polyethers defined more fully above, are characterized, as compared with those already known, by high elasticity, smaller permanent deformation, easy processibility, greater rigidity and speedier curability. One particular technical advantage is, however, to be seen in the fact that it is possible to make the foam materials on the known continuously operating mixers, which was hitherto possible only by relying on complicated auxiliary measures when working with the products obtained by the use of unmodified polyethers as starting materials. In this way, not only is the manufacture of such foams on a large technical scale facilitated, but also their satisfactory reproducibility is, furthermore, assured by the possibility of mechanical processing.

The invention will be further illustrated by the following examples without limitation thereto, the parts being by weight.

*Example 1*

A mixture of about 36.5 mols of tetrahydrofuran, 1 mol of epichlorohydrin, and about 7.5 mols of ethylene oxide is polymerized at 35–40° C. in the presence of about 0.2 mol of ferric chloride and about 1 mol of thionyl chloride. The polymer is reacted with a sodium glycolate solution constituted of 15 mols of ethylene glycol and 6 mols of sodium hydroxide at 160° C. until chlorine exchange is complete. The resulting product is a polyether with an hydroxyl content of about 2.5%.

About 0.02 part by weight of benzoyl chloride is added to 100 parts by weight of this polyether and heated while stirring to 60° C. About 19.2 parts by weight of tolylene diisocyanate are then added and the mixture is heated to about 100° C. until the viscosity has risen to 1,200–1,300 cp./75° C. The mixture is then diluted with about 19.6 parts by weight of tolylene diisocyanate and then cooled to room temperature. The theoretical NCO content is 9%; an NCO content of 8.36% is found. The final viscosity is 10,800 cp./25° C.

For foaming purposes, to about 100 parts by weight of the prepared initial adduct are added about 2 parts by weight of omega-dimethylaminopropylethyl ether, 0.2 part by weight of pentamethyl diethylene triamine and 1.8 parts by weight of water. An elastic foam material with good physical properties is obtained.

*Example 2*

About 10 mols of tetrahydrofuran, 22.3 mols of propylene oxide, and 1 mol of epichlorohydrin are polymerized at 35–40° C. in the presence of about 1.5 mol percent of the $BF_3$ compound of tetrahydrofuran. The polymer formed is thereafter reacted at 180–190° C. with a sodium glycolate solution made from about 10 mols of 1,4-butylene glycol and 1.6 mols of sodium hydroxide until the chlorine exchange is complete. A polyether with an OH content of about 2.06% is obtained.

To about 100 parts by weight of this polyether (OH number 68) is added 0.02 part by weight of benzoyl chloride. About 15.8 parts by weight of tolylene diisocyanate are then added at 60° C., the mixture is then heated for about 1 hour at 120° C., and then allowed to cool. The viscosity of the reaction mixture is 1,420 cp./75° C. About 20.2 parts by weight of tolylene diisocyanate are added for dilution purposes and the mixture is cooled to 25° C. The final viscosity is 13,400 cp./25° C. The theoretical NCO content is calculated as 9%; 8.25 being the NCO content found. About 100 parts by weight of this initial adduct are mixed on a continuously operating mixer with about 1 part by weight of omega-dimethylaminopropyl ethyl ether, 0.8 part by weight of triethylamine and 1.8 parts by weight of water. An elastic foam material with good physical properties is obtained.

It is to be understood that any of the above listed alkylene oxides may be substituted for the alkylene oxides appearing in the foregoing examples. Likewise, any of the hereinbefore listed organic polyisocyanates may also be substituted in the above examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for the production of improved cellular polyurethane plastics comprising reacting an organic polyisocyanate, water, and an organic polyhydroxyl compound containing ether linkages and at least three hydroxyl groups comprising the polymerization product of tetrahydrofuran, alkylene oxide, and epichlorohydrin, which has been reacted with a glycolate having the formula $HO(CH_2)_nOMe$, wherein $n$ is an integer of from two to six and Me is an alkali metal, to provide hydroxyl groups for the chlorine atoms.

2. A process for the production of improved cellular polyurethane plastics which comprises reacting an organic polyisocyanate, water and an organic polyhydroxyl compound having a molecular weight of at least about 500, said polyhydroxyl compound containing at least three hydroxyl groups and obtained by copolymerizing tetrahydrofuran, an alkylene oxide, and epihlorohydrin, and subsequently reacting the product thereof with a glycolate having the formula $HO(CH_2)_nOMe$, wherein $n$ is an integer of from two to six and Me is an alkali metal, to provide hydroxyl groups for the chlorine atoms.

3. A process for the production of improved cellular polyurethane plastics which comprises reacting an organic polyisocyanate, water and an organic polyhydroxyl compound having a molecular weight of at least about 500, said polyhydroxyl compound containing at least three hydroxyl groups and obtained by copolymerizing tetrahydrofuran, ethylene oxide, and epichlorohydrin, and subsequently reacting the product thereof with a glycolate having the formula $HO(CH_2)_nOMe$, wherein $n$ is an integer of from two to six and Me is an alkali metal, to provide hydroxyl groups for the chlorine atoms.

4. A process for the production of improved cellular polyurethane plastics which comprises reacting an organic polyisocyanate, water and an organic polyhydroxyl compound having a molecular weight of at least about 500, said polyhydroxyl compound containing at least three hydroxyl groups and obtained by copolymerizing tetrahydrofuran, propylene oxide, and epichlorohydrin, and subsequently reacting the product thereof with a glycolate having the formula $HO(CH_2)_nOMe$ wherein $n$ is an integer of from two to six and Me is an alkali metal, to provide hydroxyl groups for the chlorine atoms.

5. A process for the production of improved cellular polyurethane plastics which comprises reacting an organic polyisocyanate, water and an organic polyhydroxyl compound having a molecular weight of at least about 500, said polyhydroxyl compound containing at least three hydroxyl groups and obtained by copolymerizing about 36.5 mols of tetrahydrofuran, about 7.5 mols of ethylene oxide, and about 1 mol of epichlorohydrin, and subsequently reacting the product thereof with a glycolate having the formula $HO(CH_2)_nOMe$, wherein $n$ is an integer of from two to six and Me is an alkali metal, to provide hydroxyl groups for the chlorine atoms to obtain a branched polyether having an hydroxyl content of about 2.5%.

6. A process for the production of improved cellular polyurethane plastics which comprises reacting an organic polyisocyanate, water and an organic polyhydroxyl compound having a molecular weight of at least about 500, said polyhydroxyl compound containing at least three hydroxyl groups and obtained by copolymerizing about 10 mols of tetrahydrofuran, about 22.3 mols of propylene oxide, and about 1 mol of epichlorohydrin, and subsequently reacting the product thereof with a glycolate having the formula $HO(CH_2)_4ONa$ comprising a solution of about 1.6 mols of sodium hydroxide in about 10 mols of about 1,4-butylene glcyol.

7. The cellular polyurethane plastic prepared by the process of claim 2.

8. A process for the production of improved cellular polyurethane plastics comprising reacting an excess of an organic polyisocyanate, water and an organic polyhydroxyl compound containing at least three hydroxyl groups, said polyhydroxyl compound prepared by the process which comprises polymerizing from about 1 percent to about 10 percent of epichlorohydrin, with from about 5 percent to about 95 percent of the remainder of tetrahydrofuran and from about 95 percent to about 5 percent of the remainder of an alkylene oxide, respectively, and reacting the polymerization product with a glycolate having the formula $HO(CH_2)_nOMe$, wherein $n$ is an integer of from two to six and Me is an alkali metal, to provide hydroxyl groups for the chlorine atoms.

References Cited in the file of this patent
UNITED STATES PATENTS

| 2,809,177 | Shokal | Oct. 8, 1957 |
| 2,843,568 | Benning et al. | July 15, 1958 |
| 2,866,774 | Price | Dec. 30, 1958 |